US007873866B2

(12) United States Patent
Nonaka et al.

(10) Patent No.: US 7,873,866 B2
(45) Date of Patent: Jan. 18, 2011

(54) COMPUTER SYSTEM, STORAGE SYSTEM AND CONFIGURATION MANAGEMENT METHOD

(75) Inventors: Yusuke Nonaka, Sagamihara (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 289 days.

(21) Appl. No.: 12/255,297

(22) Filed: Oct. 21, 2008

(65) Prior Publication Data

US 2010/0050012 A1   Feb. 25, 2010

(30) Foreign Application Priority Data

Aug. 25, 2008  (JP)  ............... 2008-215474

(51) Int. Cl.
*G06F 11/00* (2006.01)
(52) U.S. Cl. ............................................. 714/7; 714/5
(58) Field of Classification Search .................... 714/5, 714/6, 7–13, 42, 54
See application file for complete search history.

(56) References Cited

U.S. PATENT DOCUMENTS

| 5,751,937 A | 5/1998 | Arai et al. | |
|---|---|---|---|
| 5,960,169 A * | 9/1999 | Styczinski | 714/6 |
| 2006/0200697 A1 * | 9/2006 | Ito | 714/6 |
| 2008/0091972 A1 | 4/2008 | Tanaka et al. | |
| 2008/0147934 A1 | 6/2008 | Nonaka et al. | |

FOREIGN PATENT DOCUMENTS

| JP | 7-141121 | 6/1995 |
|---|---|---|
| JP | 2008-97318 | 4/2008 |
| JP | 2008-97331 | 4/2008 |

OTHER PUBLICATIONS

U.S. Appl. No. 12/010,846, filed Jan. 30, 2008.
U.S. Appl. No. 12/068,088, filed Feb. 1, 2008.

* cited by examiner

*Primary Examiner*—Dieu-Minh Le
(74) *Attorney, Agent, or Firm*—Brundidge & Stanger, P.C.

(57) ABSTRACT

Maintenance storage system by storage system is enabled, and the removal or replacement of a storage system is enabled while continuing the operation of a system.

In a computer system including a first storage system having a plurality of first storage devices and a second storage system having a plurality of second storage devices, when the number of the first storage devices under normal operation in the first storage system is equal to or smaller than a predetermined threshold, and data stored in the first storage devices under normal operation can be migrated to the second storage devices, the data stored in the first storage devices under normal operation are duplicated to the second storage devices, and information indicating that the first storage system can be removed from the computer system is output.

15 Claims, 12 Drawing Sheets

FIG. 2A

CONFIGURATION INFORMATION (ARRAY CHASSIS)

| UNIT | STATUS |
|---|---|
| CONTROLLER 1 | NORMAL |
| CONTROLLER 2 | NORMAL |
| POWER SUPPLY 1 | NORMAL |
| POWER SUPPLY 2 | NORMAL |
| FAN 1 | NORMAL |
| FAN 2 | NORMAL |
| HOST I/F | USED |

| HDD NUMBER | CAPACITY | RAID GROUP NUMBER | STATUS |
|---|---|---|---|
| 1 | 500GB | 1 | NORMALLY USED |
| 2 | 500GB | 1 | NORMALLY USED |
| 3 | 500GB | — | BLOCKED |
| 4 | 500GB | — | BLOCKED |
| 5 | 500GB | — | BLOCKED |
| 6 | 500GB | 1 | NORMALLY USED |
| 7 | 500GB | 1 | FAILURE |
| 8 | 500GB | 1 | NORMALLY USED |
| 9 | 500GB | 1 | NORMALLY USED |
| 10 | 500GB | 1 | NORMALLY USED |
| 11 | 500GB | 1 | NORMALLY USED |
| 12 | 500GB | 1 | NORMALLY USED |

| ARRAY CHASSIS USED TIME | OO TIME |
|---|---|

FIG. 2B

CONFIGURATION INFORMATION (ARRAY CHASSIS)

| UNIT | STATUS |
|---|---|
| CONTROLLER 1 | NORMAL |
| CONTROLLER 2 | NORMAL |
| POWER SUPPLY 1 | NORMAL |
| POWER SUPPLY 2 | NORMAL |
| FAN 1 | NORMAL |
| FAN 2 | NORMAL |
| HOST I/F | USED |

| HDD NUMBER | CAPACITY | RAID GROUP NUMBER | STATUS |
|---|---|---|---|
| 1 | 1TB | 2 | NORMALLY USED |
| 2 | 1TB | 2 | NORMALLY USED |
| 3 | 1TB | 2 | NORMALLY USED |
| 4 | 1TB | 2 | NORMALLY USED |
| 5 | 1TB | 2 | NORMALLY USED |
| 6 | 1TB | 1 | NORMALLY USED |
| 7 | 1TB | — | FREE |
| 8 | 1TB | — | FREE |
| 9 | 1TB | — | FREE |
| 10 | 1TB | — | FREE |
| 11 | 1TB | — | FREE |
| 12 | 1TB | — | FREE |

| ARRAY CHASSIS USED TIME | OO TIME |
|---|---|

FIG. 4
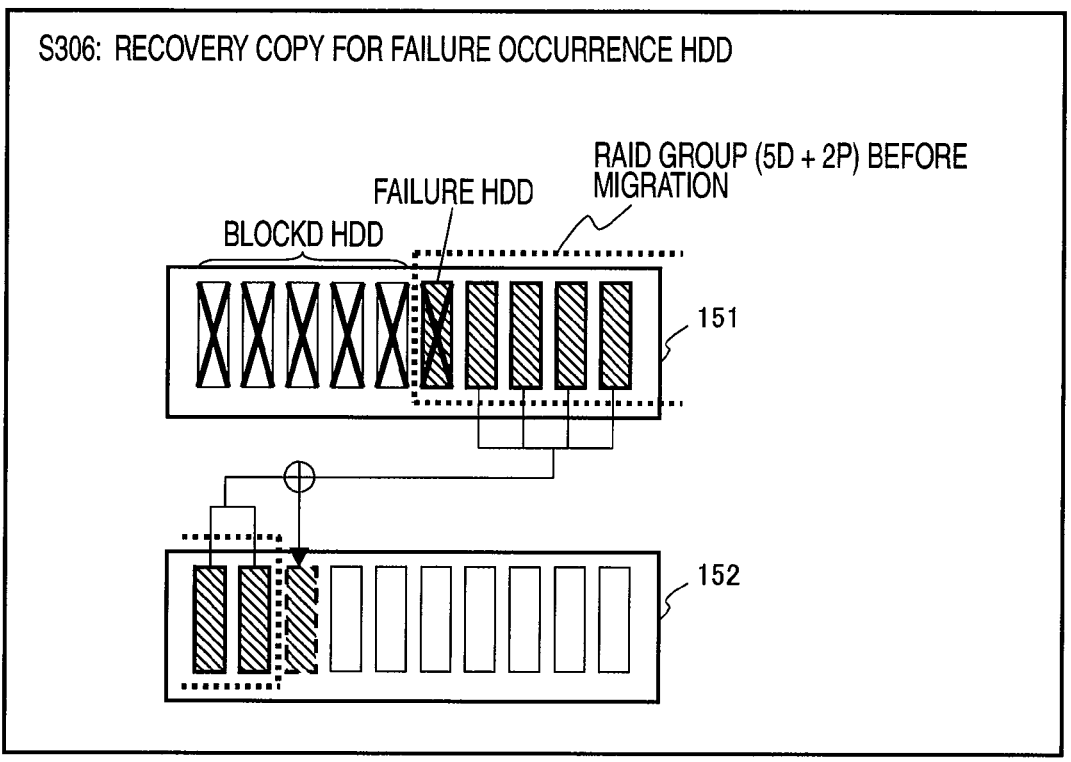
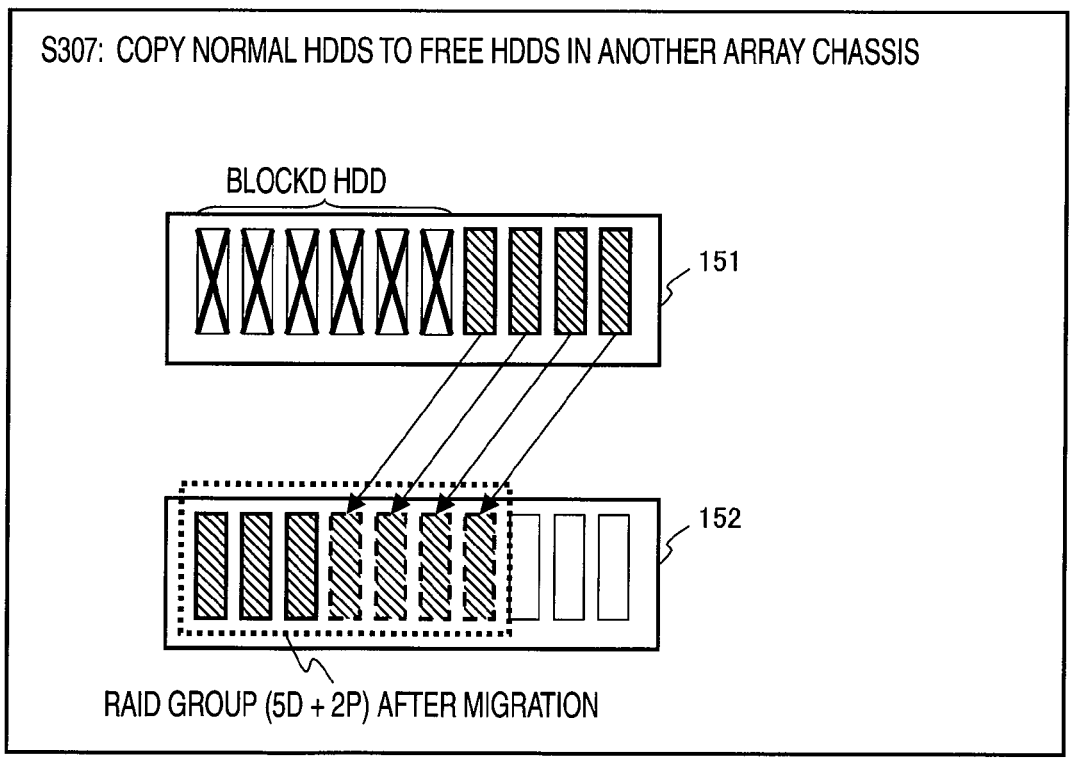

FIG. 11
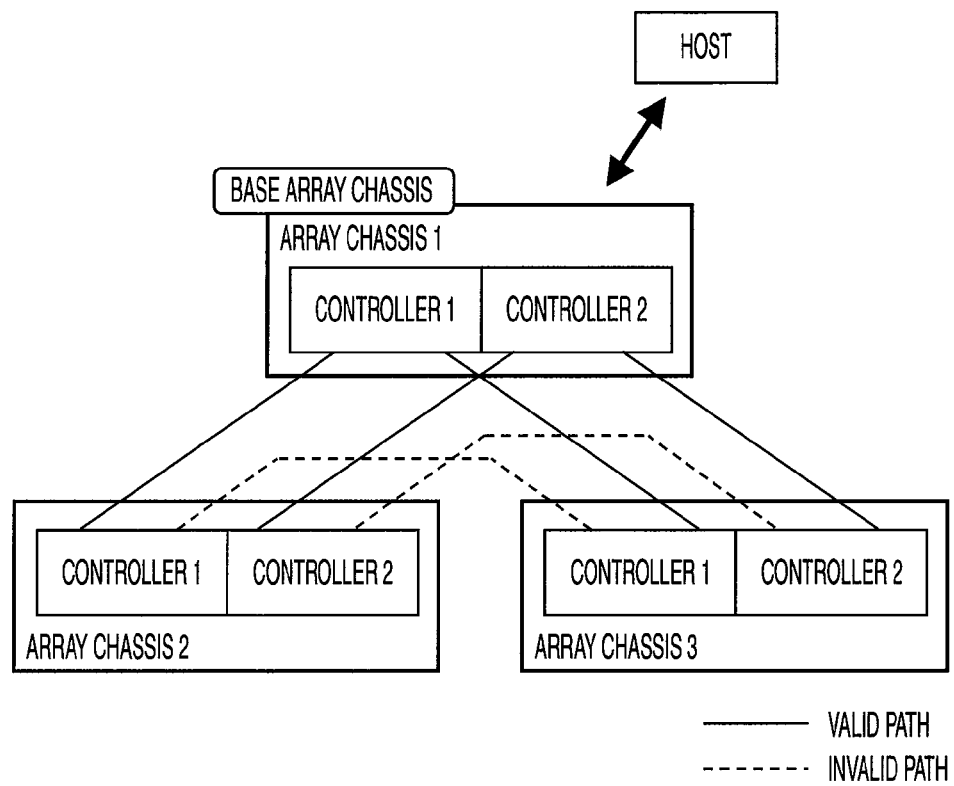
— VALID PATH
----- INVALID PATH
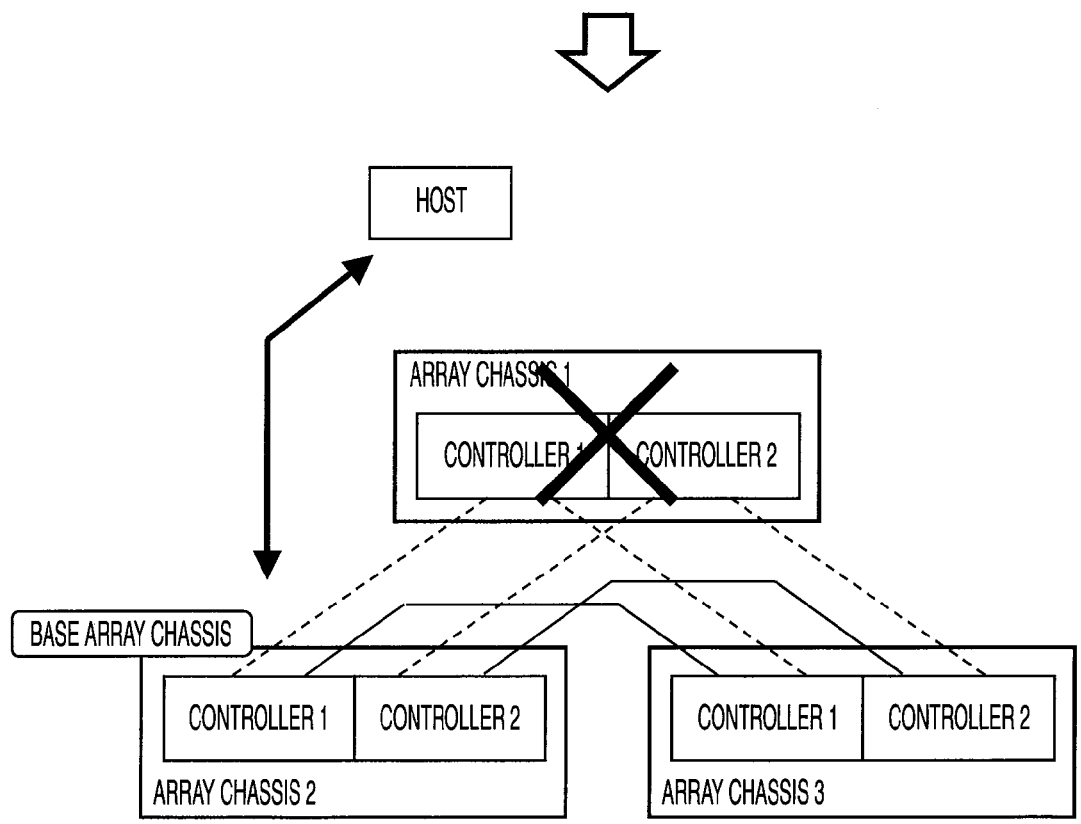

COMPUTER SYSTEM, STORAGE SYSTEM AND CONFIGURATION MANAGEMENT METHOD

CROSS REFERENCES TO RELATED APPLICATIONS

This application relates to and claims priority from Japanese Patent Application No. 2008-215474, filed on Aug. 25, 2008, the entire disclosure of which is incorporated herein by reference.

BACKGROUND OF THE INVENTION

1. Field of the Invention

The present invention relates to a technique for performing maintenance of a storage system.

2. Description of Related Art

In recent years, data consolidation in a storage system has been generally performed by a SAN (Storage Area Network) along with an increase in data amount handled in an information system.

A storage system includes a disk drive, a controller, a power unit or the like and can be replaced and added part by part when a failure has occurred. However, since maintenance work such as the replacement and addition of components of the storage system requires special knowledge, a maintenance personnel does the work on site each time a failure occurs in many cases. Further, since the storage system consists of numerous parts, of which the life is not uniform, a maintenance personnel must do the work on site many times. Cost such as a labor cost increases due to the work by a maintenance personnel, and further it takes a time to recover a failure in some cases when a maintenance personnel cannot be secured.

In view of this, a technique for performing maintenance storage system (array chassis) by storage system in which the configuration of a disk drive, a controller, a power unit or the like is black boxed has been disclosed (refer to Patent Document 1). According to the technique disclosed in Patent Document 1, since maintenance is performed array chassis by array chassis, maintenance management can be easily performed compared with a conventional storage system that requires maintenance part by part.

Patent Document 1: JP-A-2008-97318

SUMMARY OF THE INVENTION

The technique disclosed in Patent Document 1 has a problem in a maintenance method in the case of adding an array chassis in order to increase a storage capacity because the technique is assumed to be used in only one array chassis. When a technique for performing data migration between computer systems that is disclosed in Patent Document 1 is used, data migration must be performed for all array chassis included in a computer system even in the case of a failure of one array chassis, which is wasteful.

Further, in the case where a generally used method for recovering data to another disk drive (storage device) is used when a failure has occurred in a disk drive, a disabled disk drive in which a failure has occurred increases in a black boxed array chassis due to the repetition of recovery of failure, resulting in a problem of reducing valid storage capacity. In addition, power consumed by an array chassis and a space occupied by an array chassis are the same as those in the case where a failure has not occurred even when a valid storage capacity is reduced.

In view of the above, the invention intends to provide a technique that enables maintenance array chassis by array chassis and enables the addition, removal and replacement of an array chassis while continuing the operation of a system.

A typical embodiment of the invention provides a computer system including a plurality of storage systems accessed by a host computer. The plurality of storage systems include a first storage system and a second storage system. The first storage system includes at least one first interface connected to the host computer and the second storage system, a first processor connected to the first interface, a first memory connected to the first processor and a plurality of first storage devices for storing data read and written by the host computer. The second storage system includes at least one second interface connected to the host computer and the first storage system, a second processor connected to the second interface, a second memory connected to the second processor and a plurality of second storage devices for storing data read and written by the host computer. The first storage system determines whether or not the number of the first storage devices under normal operation in the first storage system is larger than a predetermined threshold, determines whether or not data stored in the first storage devices under normal operation can be migrated to the second storage devices when the number of the first storage devices under normal operation is equal to or smaller than the predetermined threshold, duplicates the data stored in the first storage devices under normal operation to the second storage devices when the data stored in the first storage devices under normal operation can be migrated to the second storage devices, and outputs information indicating that the first storage system can be removed from the computer system.

According to an embodiment of the invention, when the number of storage devices under normal operation in an array chassis (first storage system) becomes equal to or smaller than a predetermined threshold, data are migrated to another array chassis (second storage system) so that an array chassis can be removed or replaced while continuing the operation of a system.

BRIEF DESCRIPTION OF THE DRAWINGS

FIG. 2A is a diagram showing an example of configuration information of an array chassis according to the embodiment of the invention;

FIG. 2B is a diagram showing an example of configuration information of another array chassis according to the embodiment of the invention;

FIG. 4 are diagrams explaining a procedure for copying data in order to remove an array chassis according to the embodiment of the invention;

FIG. 11 is a diagram explaining a procedure for removing an array chassis in the modified example of the embodiment of the invention.

DESCRIPTION OF THE PREFERRED EMBODIMENT

Hereinafter, an embodiment of the invention will be explained with reference to the drawings.

Figure 1:
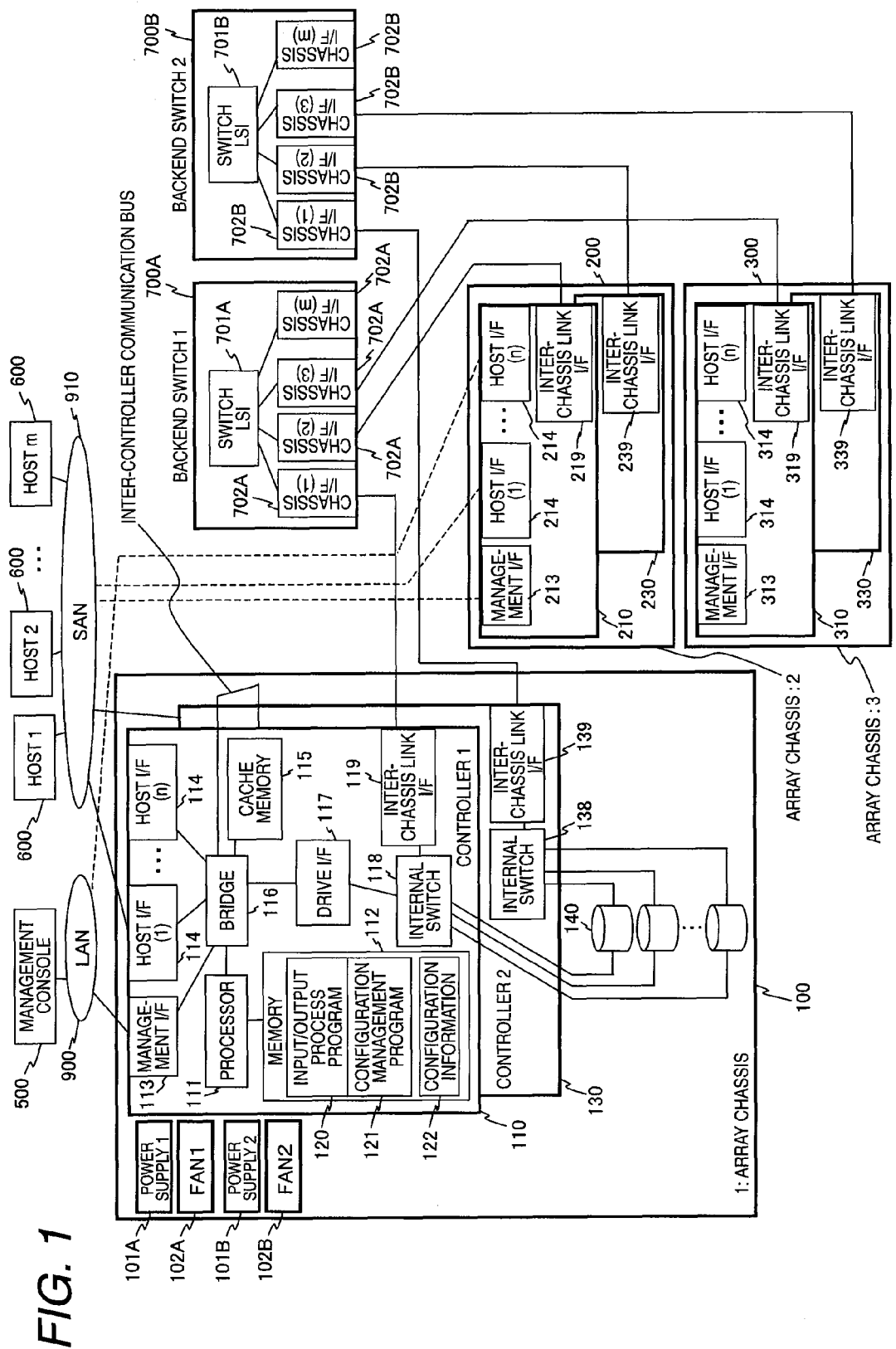
FIG. 1 is a diagram showing a configuration of a computer system according to the embodiment of the invention.

FIG. 1 is a diagram showing a configuration of a computer system according to the embodiment of the invention.

The computer system according to the embodiment of the invention includes array chassis 100, 200 and 300, a management console 500, host computers 600 and backend switches 700A and 700B.

Each of the host computers 600, in which an application program or the like is executed, reads and writes data stored in a storage area provided by each of the array chassis. The management console 500 manages the computer system and particularly manages the array chassis.

The array chassis 100 provides a storage area from and into which data are read and written by the host computers 600. Although the computer system according to the embodiment of the invention includes the three array chassis 100, 200 and 300, the array chassis 100 will be explained on behalf of them when a common matter is explained. A configuration of the array chassis 100 will be explained later in detail. The array chassis can be added to the computer system at any timing.

The array chassis 100 and the management console 500 are connected to each other via a network (LAN 900) in the related art such as Ethernet ("Ethernet" is a registered trademark, hereinafter the same). Likewise, the array chassis 100 and the host computers 600 are connected with one another via a network (SAN 910) such as a Fibre Channel or Ethernet. In the embodiment of the invention, although the LAN 900 and the SAN 910 are formed independently of each other, a single network functioning as both the LAN 900 and the SAN 910 may be used.

The array chassis 100, 200 and 300 are connected with one another via the backend switches 700A and 700B. In the embodiment of the invention, only the array chassis 100 is connected to the host computers 600. The host computers 600 access data stored in the array chassis 200 and the array chassis 300 via an inter-chassis link interface (I/F) 119 and an inter-chassis link I/F 139 in the array chassis 100.

The backend switches 700A and 700B are provided so as to enable communication between any array chassis. This can maintain the connection between other array chassis even when a failure or the like has occurred in the array chassis included in the system. In addition, the backend switches 700A and 700B are made redundant so that even when a failure has occurred in one of the backend switches 700A and 700B, the connection among the array chassis can be maintained by another of the backend switches 700A and 700B.

The backend switch 700A includes a switch LSI 701A for controlling the connection among the array chassis and chassis I/Fs 702A connected to the array chassis. The backend switch 700B has also the same configuration, including a switch LSI 701B and chassis I/Fs 702B.

The array chassis 100 includes power supplies 101A and 101B, FANs 102A and 102B, controllers 110 and 130 and a plurality of storage devices 140. A configuration of the power supply, the FAN and the controller is made redundant in case of occurrence of a failure or the like. The array chassis 100 is black boxed, so that internal components cannot be individually maintained in general. When a failure has occurred, the array chassis 100 is operated so as to be replaced or added array chassis by array chassis.

The power supplies 101A and 101B supply power to the array chassis 100. The FANs 102A and 102B exhaust heat generated by the operation of the array chassis 100.

As described above, the array chassis 100 includes the plurality of storage devices 140. The storage devices 140 each store data that are read and written by the host computers 600. The storage device 140 maybe a magnetic-storage device or other storage devices such as a semiconductor memory. In the embodiment of the invention, a magnetic-storage device (hard disk drive, HDD) is used as a storage device.

Further, the plurality of storage devices 140 configure a RAID group in the array chassis 100. The array chassis 100 provides a logical unit in which a RAID group is divided into logical units to the host computers 600 as a storage area. In some cases, a RAID group spans the array chassis. For example, a storage device included in the array chassis 100 and a storage device included in the array chassis 200 can constitute one RAID group.

A controller 1 (110) and a controller 2 (130) control the array chassis 100. Since the controller 1 (110) and the controller 2 (130) have the same configuration, the controller 110 will be explained regarding the common configuration.

The controller 110 includes a processor 111, a memory 112, a management I/F 113, host I/Fs 114, a cache memory 115, a bridge 116, a drive I/F 117, an internal switch 118 and an inter-chassis link I/F 119.

The processor 111 executes various kinds of processing including the control of the array chassis 100 based on a program and data stored in the memory 112. The memory 112 stores a program executed by the processor 111 and data necessary for the execution of the program. Specifically, the memory 112 stores an input/output process program 120, a configuration management program 121 and configuration information 122.

The input/output process program 120 is a program for executing reading and writing of data requested by the host computers 600. The configuration management program 121 is a program for managing the configuration of the array chassis 100. Specifically, the configuration management program 121 manages the association among the storage devices 140, a RAID group and a logical unit. The configuration management program 121 is executed when an array chassis is replaced or newly added. Further, when a failure has occurred the configuration management program 121 has a function of recovering or duplicating data stored in the storage devices 140 of the array chassis 100 to a storage device included in other array chassis such as the array chassis 200. The configuration information 122 stores information such as the status of each configuration of the array chassis 100. The configuration information 122 will be explained later with reference to FIG. 2A and FIG. 2B.

The management I/F 113 is connected to the management console 500 via the LAN 900. The management I/F 113 receives a request sent from the management console 500. More than one host I/Fs 114 are provided, being connected to the host computers 600 via the SAN 910. The host I/Fs 114 receive a request for reading and writing of data sent from the host computers 600.

The cache memory 115 is a temporal storage area provided for speeding up the input and output of data with respect to the storage devices 140. The cache memory 115 is generally a volatile memory but can be a non-volatile memory or a magnetic-storage device instead. The number and capacity of the cache memory 115 are not especially restrictive.

The bridge 116 connects the respective configurations included in the controller 110 with one another. Further, an inter-controller communication bus is connected to the bridge 116 for connecting the controller 110 and the controller 130 to each other. Connecting the redundant controllers to each other synchronizes the configuration information 122, which makes it possible to continue processing even when a failure has occurred in one of the controllers.

The drive I/F 117 is an interface for connecting the configurations to execute control by the controller 110 and the storage devices 140 to each other. The internal switch 118 connects the plurality of storage devices 140 and the inter-chassis link I/F 119 to the drive I/F 117, having a function of switching each port between valid and invalid. The inter-chassis link I/F 119 is an interface for connecting the array chassis with one another.

As described above, since the host computers 600 are connected only to the array chassis 100 in the embodiment of the invention, the storage devices in the array chassis 200 and the array chassis 300 are generally accessed via inter-chassis link I/Fs 219, 239, 319 and 339 not via host I/Fs 214 and 314. Therefore, in the array chassis 200 and the array chassis 300, the internal switch is switched to block the connection between the drive I/F and the storage devices in order to prevent the controllers 210, 230, 310 and 330 from erroneously accessing the storage devices.

The configuration of the array chassis 200 and the array chassis 300 is the same as that of the array chassis 100 described above. In FIG. 1, only the interfaces included in the array chassis 200 and the array chassis 300 are illustrated, and other configurations are omitted.

As described above, since the host computers 600 access data stored in the array chassis 200 and the array chassis 300 via the array chassis 100, the host computers 600 do not need to be connected to the host I/F 214 and the host I/F 314. Accordingly, the host I/F 214 and the host I/F 314 are not connected to the SAN 910 in the embodiment of the invention. Likewise, the array chassis 200 and the array chassis 300 are not connected to the management console 500, and a management I/F 213 and a management I/F 313 are not connected to the LAN 900.

FIG. 2A and FIG. 2B are diagrams each showing an example of the configuration information 122 of the array chassis according to the embodiment of the invention. FIG. 2A shows the configuration information 122 of the array chassis 100 while FIG. 2B shows the configuration information 122 of the array chassis 200.

The configuration information 122 includes configuration status information 125, storage device configuration information 126 and an array chassis used time 127. The configuration information 122 further includes corresponding information such as a logical unit provided by a RAID group.

The configuration status information 125 stores a status 1252 corresponding to respective units 1251 constituting the array chassis 100 other than the storage devices 140. For example, the controllers, the power supplies, the FANs and the host I/F correspond to the unit 1251 as shown in FIG. 2A. Specifically, in the case where the unit 1251 is the power supply, "normal" is recorded in the status 1252 when the power supply is normally operating, and "failure" is recorded when the power supply has a failure. The same goes for the controllers and the FANs.

In the case where the unit 1251 is the host I/F, "used" or "unused" is recorded in the status 1252. As described above, since the host computers 600 are connected to the host I/F 114 via the SAN 910, "used" is recorded in the status 1252 as shown in FIG. 2A. On the other hand, since the array chassis 200 is accessed by the host computers 600 via the inter-chassis link I/F in the array chassis 100, the host I/F 214 is not used, and therefore "unused" is recorded in the status 1252 as shown in FIG. 2B. When an array chassis is added to the computer system for the first time, an initial value of the status 1252 is set to "used", and when an array chassis is added later, an initial value of the status 1252 is set to "unused".

The number of array chassis that is directly accessed by the host computers 600 is not necessarily limited to one, but more than one array chassis may be directly accessed by the host computers 600. The value of the status 1252 of the host I/F included in the configuration status information 125 of each array chassis can be changed by the management console 500.

The storage device configuration information 126 records the status of each storage device. The storage device configuration information 126 includes a HDD number 1261, a capacity 1262, a RAID group number 1263 and a status 1264.

The HDD number 1261 is identification information of the storage devices 140. It may suffice that the HDD number 1261 can uniquely identify the storage devices 140 in the same array chassis.

The capacity 1262 is a storage capacity of the storage device 140 identified by the HDD number 1261. The capacity 1262 may differ according to array chassis and storage device. Since it is considered that the capacity of a storage device will increase with the times, the storage capacity of an array chassis added later might be larger than that of an array chassis originally operated. However, the storage capacity of an entire RAID group is determined based on a minimum storage capacity in storage devices included in a RAID group. Accordingly, in view of storage efficiency, it is desirable that storage devices included in one array chassis have the same capacity. The storage efficiency is the ratio of the storage capacity that can be provided to the storage capacity that can be used. When all storage devices configuring a RAID group have the same storage capacity, the capacity efficiency is 1.

The RAID group number 1263 is identification information of a RAID group configured by the storage devices 140 identified by the HDD number 1261. The RAID group number 1263 is left blank when the storage device does not configure a RAID group or is not used.

The status 1264 is information showing a status of a storage device identified by the HDD number 1261. In the embodiment of the invention, although any of "normally used", "failure", "blocked" or "free" is recorded in the status 1264 of the storage device, other status may be further recorded therein. "Normally used" is the status where the corresponding storage device is normally operating. "Failure" and "blocked" are the status where a failure has occurred in the corresponding storage device. "Failure" is the status where recovery processing has not been executed after a failure has occurred in the corresponding storage device. On the other hand, "blocked" is the status where the recovery processing was executed, and the corresponding storage device has been disconnected from the system after a failure had occurred in the storage device. "Free" is the status where the corresponding storage device is not used, and the storage device is used as recovery destination when a failure has occurred in other storage devices or used when the addition of storage area is commanded.

The array chassis used time 127 is an operating time of the array chassis 100. Although the array chassis used time 127 is not essential, it can be utilized as an indication of replacement of the array chassis due to reasons other than the occurrence of failure, for example, when the used time of the array chassis exceeds a certain period of time.

Here, the configuration information 122 will be specifically explained with reference to FIG. 2A and FIG. 2B. In the embodiment of the invention, it is assumed that the array chassis 100 is first introduced, and that thereafter the array chassis 200 is introduced. The capacity of each storage device included in the array chassis 100 is "500 GB" while the capacity of each storage device included in the array chassis 200 is "1 TB".

Referring to FIG. 2A, storage devices having the HDD number 1261 of 1, 2, 6 and 8 to 12 are normally operating in the array chassis 100. Storage devices having the HDD number 1261 of 3 to 5 are in the "blocked" status where a failure occurred in the past, and the recovery processing has been completed. Further, a storage device having the HDD number 1261 of 7 is in the "failure" status where a failure has occurred and not been recovered.

Referring to FIG. 2B, on the other hand, storage devices having the HDD number 1261 of 1 to 6 are normally operating while storage devices having the HDD number 1261 of 7 to 12 are in the "free" status where they are not used.

A RAID group having the RAID group number 1263 of "1" includes the storage devices corresponding to the HDD number 1261 of 1, 2 and 6 to 12 in the array chassis 1 and the storage device corresponding to the HDD number 1261 of 6 in the array chassis 2. The RAID group "1" consists of the ten storage devices and has, for example, a RAID 6 configuration (8D2P), which can recover even when a failure occurs in two storage devices. Further, since a RAID group is configured based on a minimum storage capacity as described above, the storage capacity per storage device is 500 GB. Accordingly, although the capacity of the storage device (the HDD number 1261 is 6) included in the array chassis 200 is 1 TB, only 500 GB is used, and the remaining 500 GB cannot be used.

Further, since a failure has occurred in the storage device (the HDD number 1261 is 7) in the array chassis 100 configuring the RAID group "1", processing for recovering data stored in the storage device is executed. Since a storage device in the status 1264 of "free" is not included in the array chassis 100, recovered data is stored in a storage device in the status 1264 of "free" included in the array chassis 200 or the array chassis 300.

Figure 3:
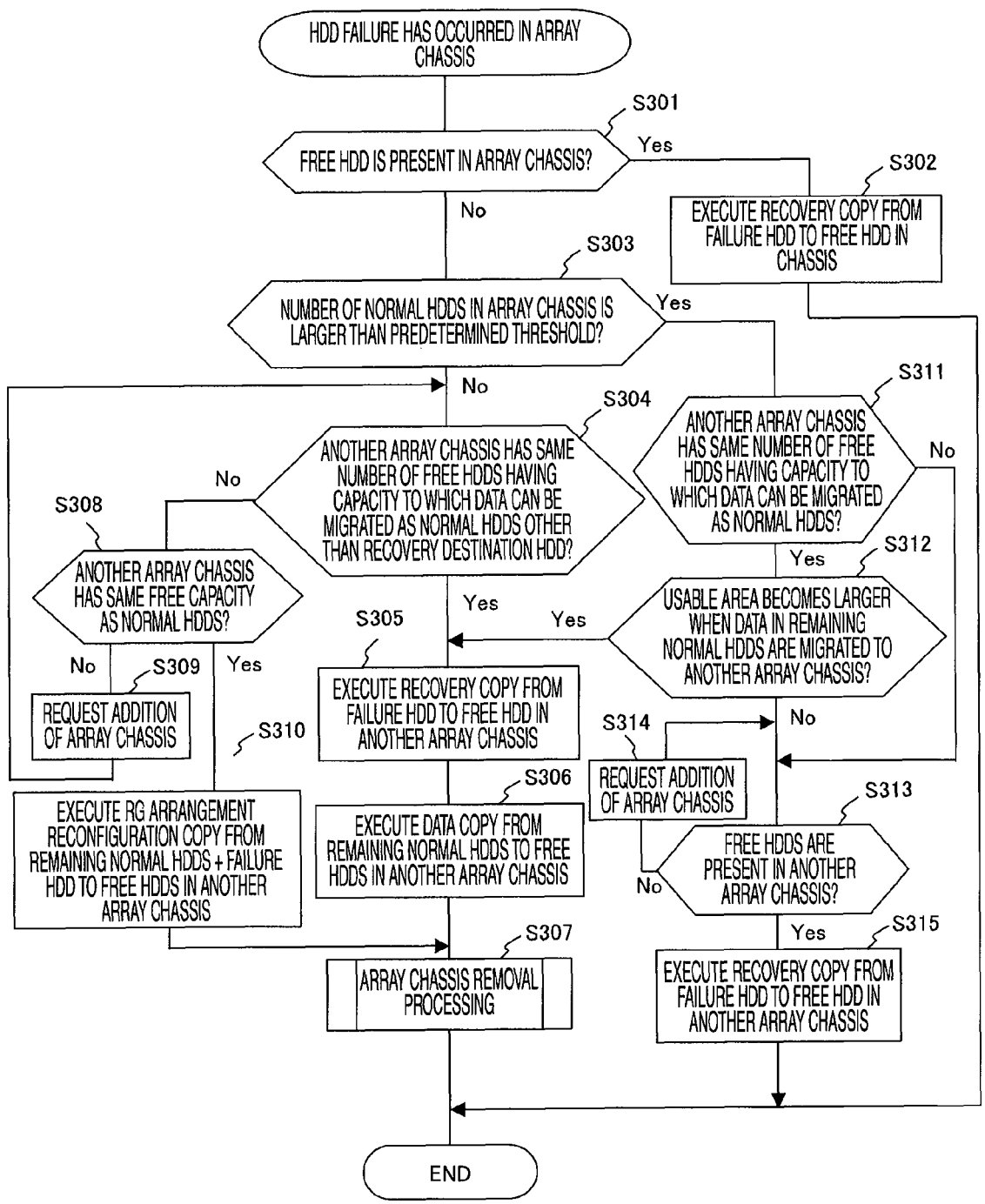
FIG. 3 is a flow chart showing a procedure for changing a configuration when a failure has occurred in a storage device included in an array chassis according to the embodiment of the invention.

FIG. 3 is a flow chart showing a procedure for changing a configuration when a failure has occurred in a storage device included in an array chassis according to the embodiment of the invention.

When a failure has occurred in a storage device included in an array chassis, this processing is executed by a controller in the array chassis. For example, when a failure has occurred in the storage device 140 included in the array chassis 100, the processing is executed by the controller 110 (or the controller 130).

When detecting that a failure has occurred in the storage device 140 included in the array chassis 100, the controller 110 in the array chassis 100 determines whether or not a storage device in the status 1264 of "free" is included in the array chassis 100 (S301).

When the storage device in the status 1264 of "free" is included in the array chassis 100 (the result of S301 is "Yes"), the controller 110 in the array chassis 100 executes recovery copy of data from the storage device in which a failure has occurred to a storage device of "free" (S302). The recovery copy is to create data stored in a storage device in which a failure has occurred by data stored in a storage device other than the storage device in which a failure has occurred configuring a RAID group and store the data in a destination storage device.

When the recovery copy is completed, the controller 110 in the array chassis 100 ends the processing. When all storage devices configuring a RAID group are included in the same array chassis, management is easier, and the array chassis is advantageously replaced. Therefore, the execution of recovery copy with respect to a storage device included in the same array chassis takes top priority.

When the storage device in the status 1264 of "free" is not included in the array chassis 100 (the result of S301 is "No"), the controller 110 in the array chassis 100 determines whether or not the number of storage devices in the status 1264 of "normally used" included in the array chassis 100 is larger than a predetermined threshold (S303). Here, in the processing in S303, it may be determined whether or not the number of storage devices in the status 1264 of "blocked" included in the array chassis 100 is equal to or smaller than a certain number.

As a blocked storage device increases in an array chassis, consumption power with respect to a storage capacity of an array chassis becomes larger, and further, a storage capacity per space for installing an array chassis becomes smaller. Therefore, when the number of blocked storage devices exceeds a predetermined threshold, the replacement of array chassis is encouraged. For example, the predetermined threshold is half the number of loaded storage devices. The predetermined threshold may be not the number of storage devices but the ratio of storage capacity provided by the entire array chassis.

When the number of storage devices in the status 1264 of "normally used" included in the array chassis 100 is equal to or smaller than the predetermined threshold (the result of S303 is "No"), the controller 110 in the array chassis 100 executes processing in S304 and after in order to replace the array chassis 100.

The controller 110 in the array chassis 100 determines whether or not another array chassis includes the same number of storage devices having a capacity in which data can be migrated and in the status 1264 of "free" as the total number of storage devices in which a failure has occurred and storage devices under operation in the array chassis 100 (S304). That is, the controller 110 determines whether or not all data in a storage device to be recovered and storage devices under normal operation can be migrated to another array chassis in order to remove the array chassis 100.

When all data in the storage devices included in the array chassis 100 can be respectively migrated to storage devices corresponding to the other array chassis (the result of S304 is "Yes"), the controller 110 in the array chassis 100 first executes recovery copy of the data stored in the storage device in which a failure has occurred to a storage device in another array chassis (S305). Further, the controller 110 copies data stored in the storage devices under normal operation in the array chassis 100 to storage devices in another array chassis (S306). Processing in S305 and S306 will be explained later with reference to FIG. 4.

In the processing in S306, when a plurality of other storage devices to which data are migrated is present, any of storage devices is available as long as it has a capacity equal to or larger than that of the storage device in which a failure has occurred. However, the storage device may be selected in consideration of the capacity efficiency. For example, by selecting a storage device having a capacity equal to or larger than that of the storage device in which a failure has occurred and as small as possible, reduction in the capacity efficiency can be suppressed. Further, a storage device in an array chassis having many storage devices included in the same RAID group may be selected so that storage devices configuring the same RAID group are included in the same array chassis as many as possible.

When all the data stored in the storage devices included in the array chassis 100 are migrated to another array chassis, the controller 110 in the array chassis 100 executes array chassis removal processing (S307). In the array chassis removal processing, processing necessary for removing an array chassis is executed. The array chassis removal processing will be explained later in detail with reference to FIG. 7.

On the other hand, when the data stored in the storage devices included in the array chassis 100 cannot be migrated to another array chassis on a storage device by storage device basis (the result of S304 is "No"), the controller 110 in the array chassis 100 determines whether or not all the data stored in the storage devices to be migrated can be migrated to another array chassis by changing the configuration of RAID group (S308). That is, it is determined in the processing in S304 whether or not the data can be migrated on a storage device by storage device basis without changing the RAID configuration while it is determined in the processing in S308 whether or not the data can be migrated to free storage devices in another array chassis by changing the RAID configuration when the storage devices included in another array chassis are deficient in number. Since the performance might be reduced when a RAID group is reconfigured, processing in S309, which requires the addition of an array chassis, may be executed without executing the determination processing in S308.

When all the data stored in the storage devices to be migrated cannot be migrated to another array chassis even by changing the configuration of RAID group (the result of S308 is "No"), the controller 110 in the array chassis 100 requests a user to add an array chassis (S309). When an array chassis having a sufficient capacity is newly added, the array chassis 100 can be removed due to the execution of the processing in S304 and after.

When all the data stored in the storage devices to be migrated can be migrated to another array chassis by changing the configuration of RAID group (the result of S308 is "Yes"), the controller 110 in the array chassis 100 reconfigures the RAID group and copies the data to another array chassis (S310) The processing for reconfiguring the RAID group will be explained later in detail with reference to FIG. 9.

As described above, since the performance might be reduced when the RAID group is reconfigured, it may be determined whether or not the processing in S310 is executed depending on the application of the RAID group to be reconfigured. Further, the determination may be automatically made by previously setting a threshold for an allowable range of the number of storage devices configuring the RAID group, or an administrator may select whether or not to execute it from the management console.

When the number of storage devices in the status 1264 of "normally used" included in the array chassis 100 is larger than the predetermined threshold (the result of S303 is "Yes"), the controller 110 in the array chassis 100 executes recovery copy of data stored in the storage device in which a failure has occurred to another array chassis because the array chassis 100 does not have to be replaced. However, the performance or capacity efficiency might be reduced when data in storage devices belonging to a RAID group are separately allocated to more than one array chassis due to the occurrence of a failure. Therefore, it is determined whether or not the reduction in the performance or capacity efficiency can be prevented by migrating all data in the storage devices under normal operation included in the array chassis 100 to another array chassis.

Specifically, the controller 110 in the array chassis 100 first determines whether or not another array chassis includes the same number of storage devices having a capacity in which data can be migrated and in the status 1264 of "free" as the total number of storage devices in which a failure has occurred and storage devices under operation in the array chassis 100 (S311). That is, the controller 110 executes the same processing as in S304 and determines whether or not the data can be migrated to another array chassis.

When the data in the storage devices in the array chassis 100 can be migrated to another array chassis (the result of S311 is "Yes"), the controller 110 in the array chassis 100 determines whether or not the reduction in capacity efficiency can be prevented when the data are migrated to another array chassis (S312). In the case where the reduction in capacity efficiency can be prevented when the data are migrated to another array chassis (the result of S312 is "Yes"), the controller 110 executes the processing in S305 and after. In this case, since it is not necessary to remove the array chassis, the processing in S307 does not have to be executed. Further, the configuration of RAID group may be changed at the time of migration. The change in capacity efficiency due to migration will be explained later with reference to FIG. 5.

When the data cannot be migrated to another array chassis (the result of S311 is "No"), or a usable area does not increase even when the data are migrated to another array chassis (the result of S312 is "No"), the controller 110 in the array chassis 100 determines whether or not a storage device to which recovery copy of data in a storage device in which a failure has occurred can be executed is included in another array chassis (S313).

When the recovery copy of the data in the storage device in which a failure has occurred cannot be executed to a storage device in another array chassis (the result of S313 is "No"), the controller 110 in the array chassis 100 requests a user to add an array chassis (S314). After an array chassis is newly added, the recovery copy is executed.

When the recovery copy of the data in the storage device in which a failure has occurred can be executed to a storage device included in another array chassis (the result of S313 is "Yes"), the controller 110 in the array chassis 100 executes the recovery copy of the data to the storage device in another array chassis (S315)

FIG. 4 are diagrams explaining a procedure for copying data in order to remove an array chassis according to the embodiment of the invention. The procedure shown in FIG. 4 corresponds to the processing in S306 and S307 in the flow chart in FIG. 3.

FIG. 4 show a system including an array chassis 151 and an array chassis 152. Each of the array chassis includes ten storage devices. A criterion to remove an array chassis is defined as the case where a failure has occurred in more than half the number of loaded storage devices.

The upper stage in FIG. 4 corresponds to the processing in S306 in the flow chart in FIG. 3. In the array chassis 151, five storage devices are in the status of "blocked", and one storage device is in the status of "failure". According to the above-described criterion to remove an array chassis, the array chassis 151 is to be removed because a failure has occurred in the sixth storage device.

As described above, in the procedure for duplicating data in order to remove an array chassis, recovery copy of data in a storage device in which a failure has occurred is first executed to a storage device included in the array chassis 152 (S306). In an example shown in FIG. 4, the data stored in the storage device in which a failure has occurred are recovered to the array chassis 152 by data and parities stored in other storage devices under normal operation. The storage device in which the recovery has been completed is changed in the status 1264 from "failure" to "blocked" and disconnected from the system.

The lower stage in FIG. 4 corresponds to the processing in S307 in the flow chart in FIG. 3. When the recovery copy of data in the storage device in which a failure has occurred is completed, data stored in the storage devices under normal operation in the array chassis to be removed are copied to the array chassis 152 (S307). When the copying is completed, task is continued in a RAID group after migration.

As described above, when the data stored in the array chassis 151 are migrated to the array chassis 152, the status of the storage devices included in the array chassis 151 becomes "blocked" or "free", which enables the removal of the array chassis 151.

Figure 5:
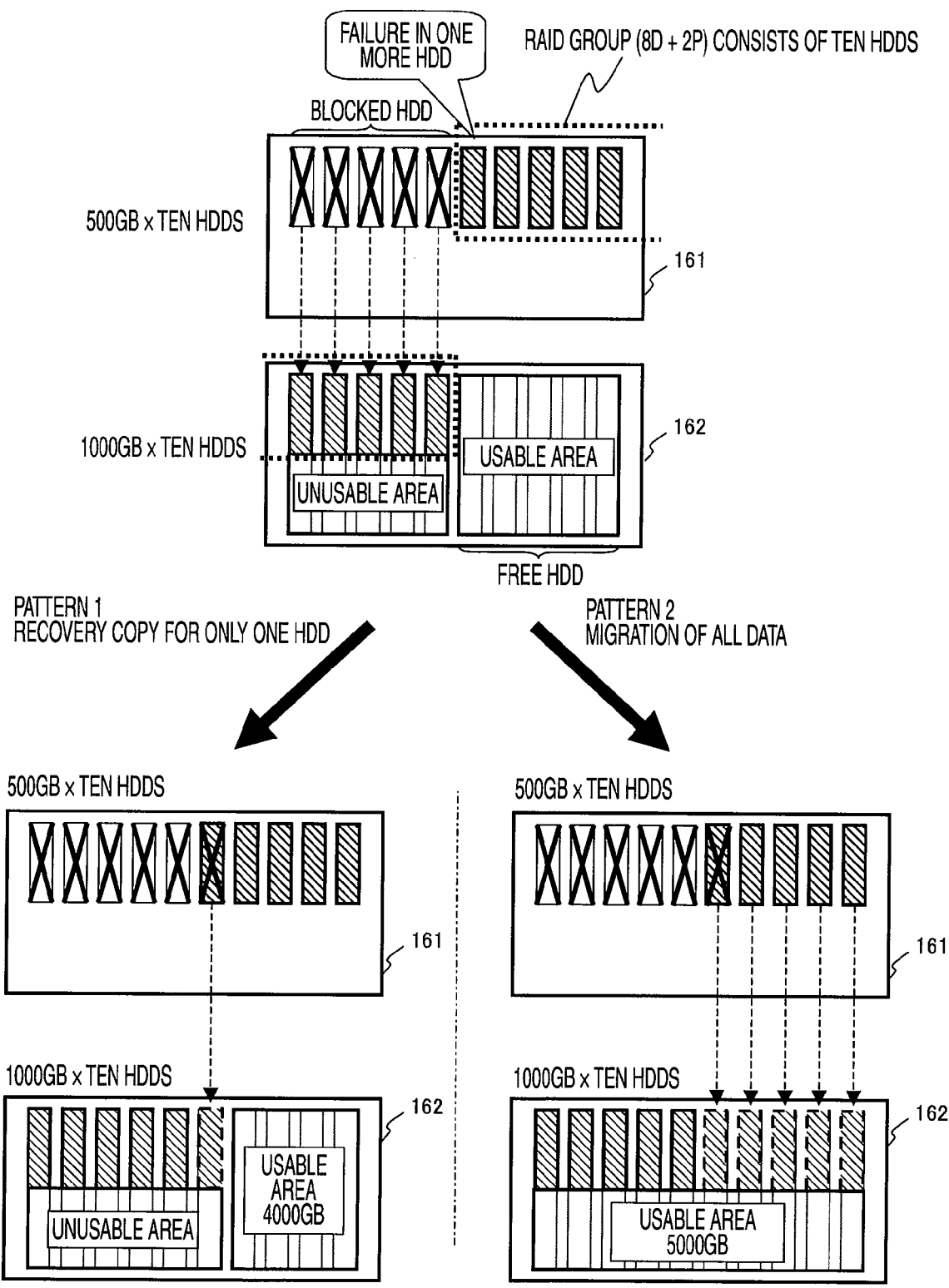
FIG. 5 are diagrams explaining the case where capacity efficiency varies depending on whether or not a RAID group is reconfigured when storage devices different in capacity coexist in a RAID group according to the embodiment of the invention.

FIG. 5 are diagrams explaining the case where capacity efficiency varies depending on whether or not a RAID group is reconfigured when storage devices different in capacity coexist in a RAID group according to the embodiment of the invention.

FIG. 5 show a system including an array chassis 161 and an array chassis 162. The array chassis 161 is loaded with ten storage devices each having a capacity of 500 GB while the array chassis 162 is loaded with ten storage devices each having a capacity of 1000 GB (1 TB). A RAID group (RAID6, 8D+2P) consists of ten storage devices.

Here, when considering the case where a failure has occurred in one more storage device included in the array chassis 161, two cases are conceivable: one is the case where recovery copy of data is performed only for the storage device in which a failure has occurred (pattern 1), and the other is the case where data in all the storage devices belonging to the same RAID group and operating in the array chassis 161 are migrated to the array chassis 162 (pattern 2).

In the pattern 1, since the storage device having a capacity of 500 GB is included in the storage devices belonging to the RAID group, only 500 GB is used in each of the storage devices belonging to the same RAID group included in the array chassis 162, and the remaining 500 GB is not used. Accordingly, the usable area of the array chassis 162 is 4000 GB (4TB).

On the other hand, when the data in all the storage devices belonging to the same RAID group included in the array chassis 161 are migrated to the array chassis 162, each capacity of all the storage devices belonging to the RAID group is 1 TB, which can eliminates the unusable area. Accordingly, the usable area of the array chassis 162 is 5000 GB (5 TB). Further, since the areas of the four storage devices each having a capacity of 500 GB in the array chassis 161 as a migration source also become usable, the capacity of 2000 GB (2TB) can be further used as a whole system.

Figure 6:
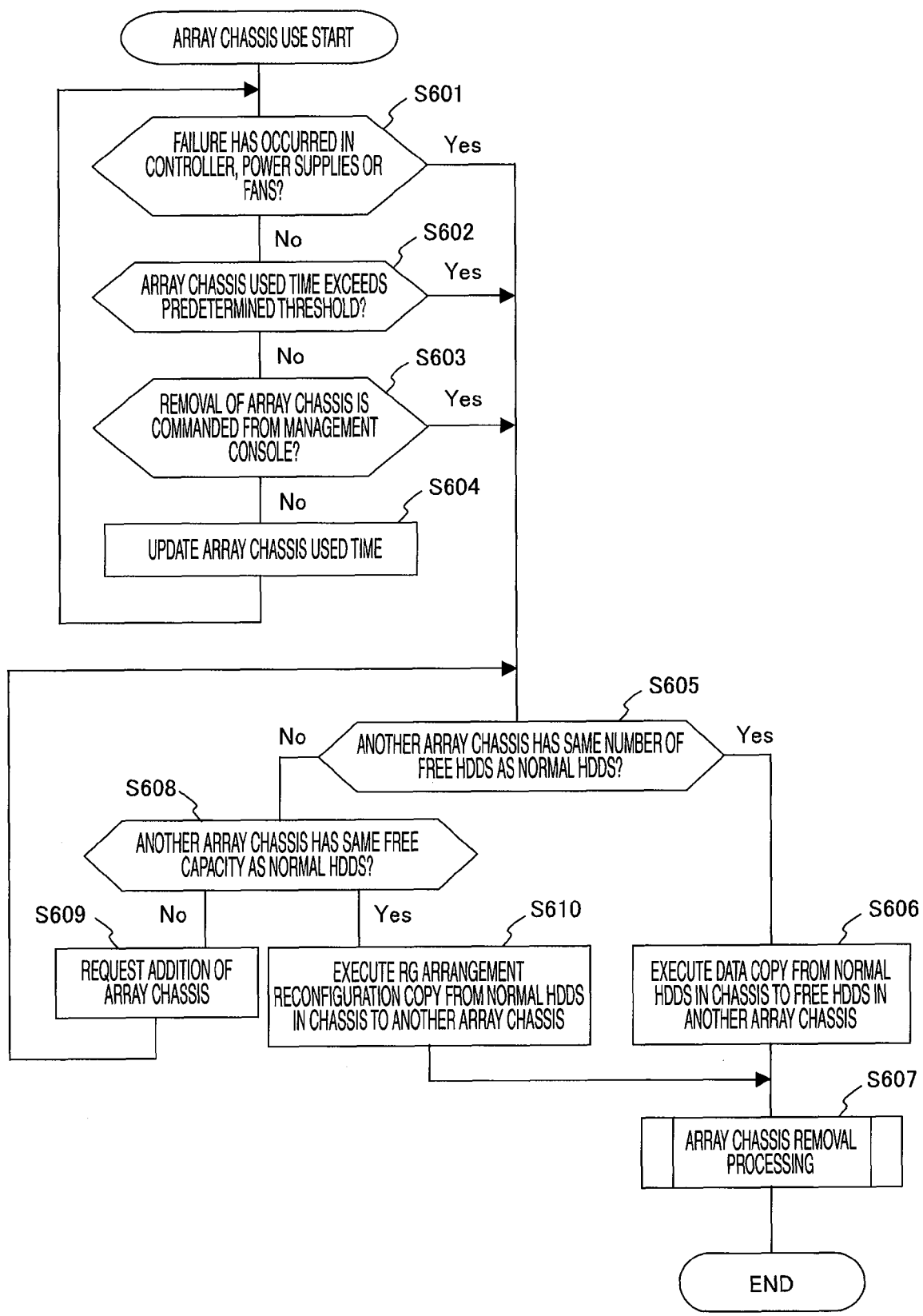
FIG. 6 is a flow chart showing a procedure for removing an array chassis in cases other than the case where a failure has occurred in a storage device included in an array chassis according to the embodiment of the invention.

FIG. 6 is a flow chart showing a procedure for removing an array chassis in cases other than the case where a failure has occurred in a storage device included in an array chassis according to the embodiment of the invention.

This processing can be executed in each array chassis under operation. The processing may be periodically executed in each array chassis or may be executed in one array chassis to monitor the activity of another array chassis. The outline of the processing is to execute processing for removing an array chassis when a failure has occurred in parts other than a storage device constituting an array chassis, or when removal direction of an array chassis is received from the management console 500. Description will be made with the array chassis 100 being as an array chassis to be removed.

The controller 110 in the array chassis 100 first determines whether or not a failure has occurred in the controller, the power supplies or the FANs (S601). As described above, the controller, the power supply and the FAN are subjected to redundancy. Further, when a failure has occurred in the controller 110, the controller 130 will execute the processing.

When a failure has not occurred in the controller, the power supplies or the FANs (the result of S601 is "No"), the controller 110 in the array chassis 100 determines whether or not used time of the array chassis 100 exceeds a predetermined threshold (S602). When the useful life of the array chassis is exceeded, the probability of failure increases, so that the controller 110 encourages a user to replace the array chassis. For example, the predetermined threshold is determined based on the useful life of the array chassis.

When the used time of the array chassis 100 does not exceed the predetermined threshold (the result of S602 is "No"), the controller 110 in the array chassis 100 determines whether or not the removal direction of the array chassis 100 is received from the management console 500 (S603). In the embodiment of the invention, a user can command the removal from the management console 500 when the array chassis 100 has to be removed by reasons other than failure occurrence.

When the removal direction of the array chassis 100 has not been received from the management console 500 (the result of S603 is "No"), the controller 110 in the array chassis 100 updates the array chassis used time 127 (S604) and returns to the processing in S601.

On the other hand, when a failure has occurred in the controller, the power supplies or the FANs (the result of S601 is "Yes"), when the used time of the array chassis 100 has exceeded the predetermined threshold (the result of S602 is "Yes"), or when the removal direction of the array chassis 100 has been received from the management console 500 (the result of S603 is "Yes"), the controller 110 in the array chassis 100 executes the processing for removing the array chassis 100. The processing for removing the array chassis 100 is the same as that for removing the array chassis at the time of failure occurrence shown in FIG. 3 except for the processing (S305) for performing the recovery copy of data in the storage device in which a failure has occurred to the storage device included in another array chassis.

Similarly to the processing in S304 in FIG. 3, the controller 110 in the array chassis 100 determines whether or not another array chassis includes the same number of storage devices having a capacity in which data can be migrated and in the status 1264 of "free" as the storage devices under normal operation in the array chassis 100 (S605).

When all data in the storage devices included in the array chassis 100 can be migrated to another array chassis on a storage device by storage device basis (the result of S605 is "Yes"), the controller 110 in the array chassis 100 copies data stored in storage devices under normal operation in the array chassis 100 to storage devices in another array chassis (S606). When the processing in S606 is completed, the controller 110 executes the array chassis removal processing (S607).

On the other hand, when the data stored in the storage devices included in the array chassis 100 cannot be migrated to another array chassis on a storage device by storage device basis (the result of S605 is "No"), the controller 110 in the array chassis 100 determines whether or not all the data stored in the storage devices to be migrated can be migrated to another array chassis by changing the configuration of RAID group (S608) similarly to the processing in S308 in FIG. 3.

When all the data stored in the storage devices in the array chassis 100 cannot be migrated to another array chassis even by changing the configuration of RAID group (the result of S608 is "No"), the controller 110 in the array chassis 100 requests a user to add an array chassis (S609).

When all the data stored in the storage devices in the array chassis 100 can be migrated to another array chassis by changing the configuration of RAID group (the result of S608 is "Yes"), the controller 110 in the array chassis 100 reconfigures the RAID group and copies the data to another array chassis (S610). Thereafter, the controller 110 executes the array chassis removal processing (S607) and ends the processing.

Figure 7:
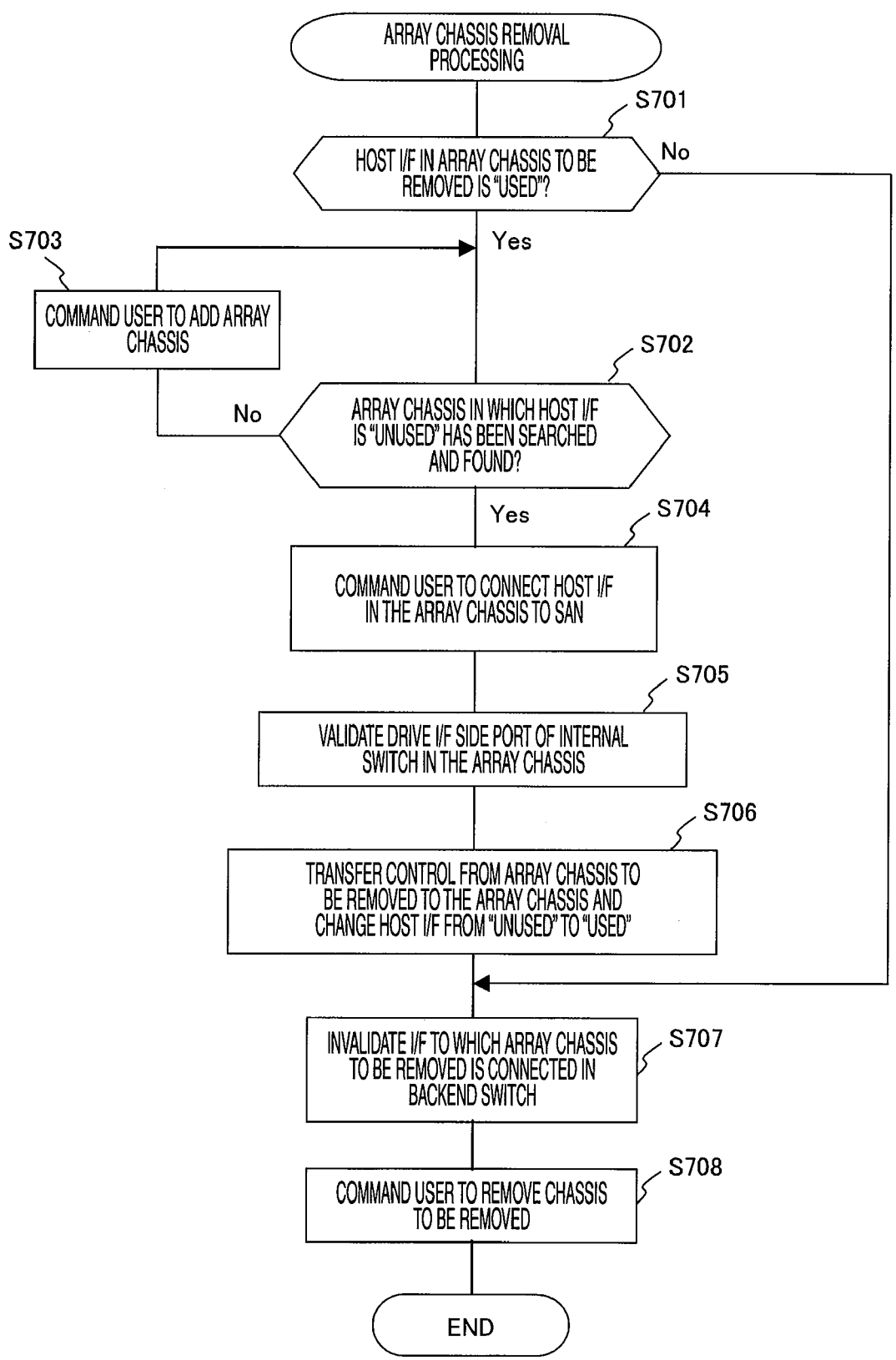
FIG. 7 is a flowchart showing a procedure of array chassis removal processing according to the embodiment of the invention.

FIG. 7 is a flow chart showing a procedure of array chassis removal processing according to the embodiment of the invention.

This processing is executed in an array chassis to be removed at the time of removing the array chassis. Description will be made with the array chassis 100 being as an array chassis to be removed.

The controller 110 in the array chassis 100 first determines whether or not the host I/F 114 is in the status of "used" (S701). When the host I/F 114 in the array chassis 100 is "used", (the result of S701 is "Yes"), the controller 110 searches an array chassis in which the host I/F is "unused" (S702). When there is no array chassis in which the host I/F is "unused" (the result of S702 is "No"), the controller 110 commands a user to add an array chassis (S703). When an array chassis in which the host I/F is used is removed, data stored in another array chassis cannot be accessed. Therefore, setting must be done so that data can be accessed via the host I/F in another array chassis.

On the other hand, when the array chassis in which the host I/F is "unused" has been searched (the result of S702 is "Yes"), the controller 110 in the array chassis 100 commands a user to connect the host I/F in the searched array chassis to the SAN 910 (S704). When more than one array chassis in which the host I/F is "unused" have been searched, the controller 110 selects an array chassis having a lower probability of being removed. Specifically, the controller 110 selects an array chassis having the minimum number of blocked storage devices or an array chassis having the maximum number of "free" storage devices. An array chassis whose used time is the smallest may be selected.

Further, the controller 110 in the array chassis 100 commands to open the drive I/F side port of the internal switch in the searched array chassis (S705). Further, the controller 110 transfers control from the array chassis 100 to be removed to the searched array chassis and updates the configuration information of the host I/F in the searched array chassis from "unused" to "used" (S706). The transfer of control is to transfer the identification information of the host I/F (for example, an IP address in the case of ISCSI) and/or to transfer an ownership of a logical unit.

When the host I/F in the array chassis 100 to be removed is "unused" (the result of S701 is "No"), or when the processing in S706 has ended, the controller 110 in the array chassis 100 closes the chassis I/F to which the array chassis to be removed is connected in the backend switch (S707). This can prevent the host computer from erroneously connecting to the array chassis to be removed. Finally, the controller 110 commands a user to physically remove the array chassis 100 from the system (S708).

Figure 8:
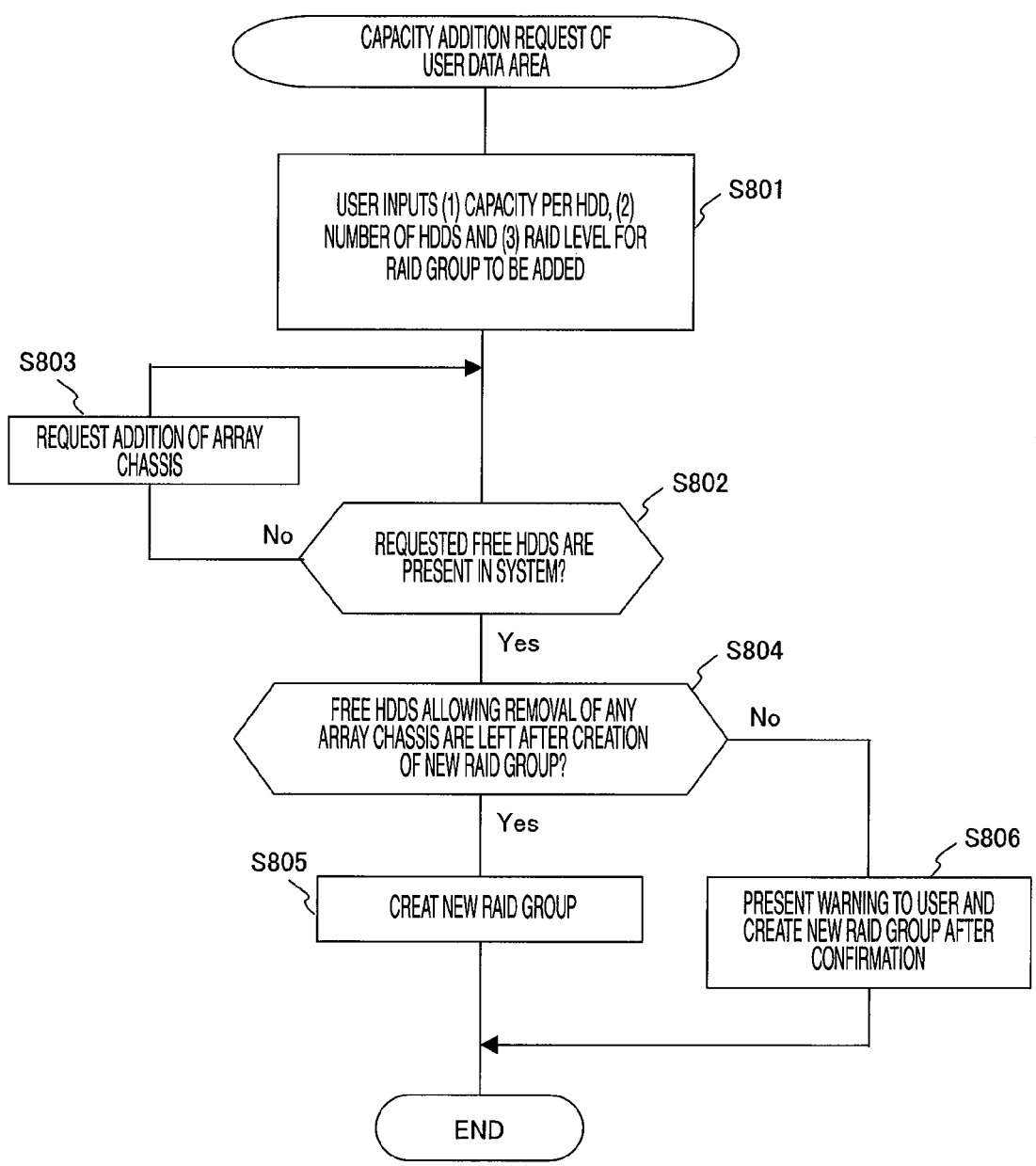
FIG. 8 is a flow chart showing a procedure for adding a data area by a user according to the embodiment of the invention.

FIG. 8 is a flow chart showing a procedure for adding a data area by a user according to the embodiment of the invention.

This processing is executed when a user commands to add a data area (storage area) from the management console 500.

The management console 500 first receives an input of configuration information of a data area to be added by a user (S801). For example, specific configuration information includes a capacity per storage device, the number of storage devices and a RAID level. A storage device to be used may be selected from a list of storage device included in an array chassis, and the capacity and number may be set based on the selected storage device.

The management console 500 determines whether or not an array chassis in the system includes the same capacity and number of storage devices in the free status as those requested by a user (S802). When an array chassis in the system does not include the same capacity and number of storage devices as those requested by a user (the result of S802 is "No"), the management console 500 requests a user to add an array chassis (S803).

On the other hand, when an array chassis in the system includes the same capacity and number of storage devices as those requested by a user (the result of S802 is "Yes"), the management console 500 determines whether or not free storage devices necessary for removing any array chassis are left after the creation of a requested RAID group (S804).

More specifically, when a data area (storage area) is newly added due to the creation of a requested RAID group, free storage devices (unused storage devices) are fewer in number as a whole computer system. In this case, it is determined whether or not free storage devices to which data in storage devices that are normally used can be migrated are included in the entire computer system without changing the number and capacity of storage devices in any array chassis even after a RAID group is newly created. Based on the determination result, it can be determined whether or not an array chassis has to be newly added when any array chassis is removed after the creation of a RAID group.

When the free storage devices necessary for removing any array chassis are left after the creation of a requested RAID group (the result of S804 is "Yes"), the management console 500 creates a requested RAID group (S805).

On the other hand, when the free storage devices necessary for removing any array chassis are not left after the creation of a requested RAID group (the result of S804 is "No"), the management console 500 presents a warning of that effect to a user and creates a requested RAID group after confirmation (S806).

Figure 9:
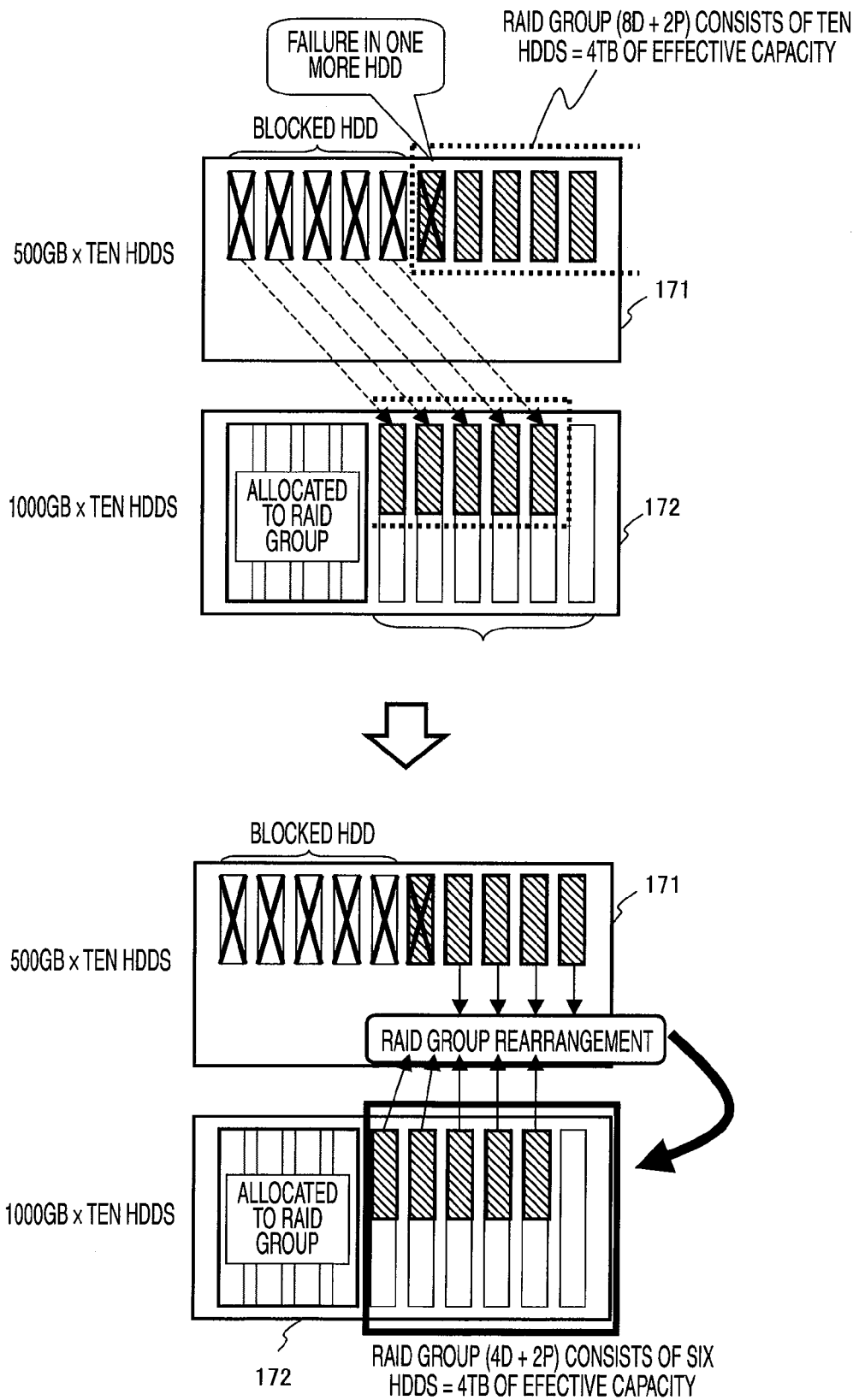
FIG. 9 are diagrams explaining a procedure for reconfiguring a RAID group from storage devices in an array chassis to be removed to storage devices included in another array chassis according to the embodiment of the invention.

FIG. 9 are diagrams explaining a procedure for reconfiguring a RAID group from storage devices in an array chassis to be removed to storage devices included in another array chassis.

FIG. 9 shows a status in which a system is operated by an array chassis 171 and an array chassis 172. Further, the array chassis 171 includes ten storage devices each having a capacity of 500 GB while the array chassis 172 includes ten storage devices each having a capacity of 1 TB.

Referring to FIG. 9, five storage devices have already been blocked in the array chassis 171. Assuming that a criterion to remove an array chassis is defined as the case where more than half the number of loaded storage devices are not operated, the array chassis 171 is to be removed when a failure has occurred in one more storage device. In the array chassis 172, four storage devices are allocated to another RAID group, and further, five storage devices serve as recovery destinations for storage devices that were operating before a failure has occurred in the array chassis 171.

Here, in the case where a failure has occurred in one storage device in the array chassis 171, an array chassis has to be newly added when an array chassis other than the array chassis 172 is not included in the system. In this case, since an array chassis cannot always be added immediately, it is attempted to avoid the addition of an array chassis by reconfiguring a RAID group in the same RAID level (S301 in FIG. 3).

The system shown in FIG. 9, which has a RAID 6 configuration of 8D+2P (8 data and 2 parities), has a storage area of 4 TB of effect capacity with the storage devices each having a capacity of 500 GB. In the array chassis 172, storage devices that belong to a RAID group to be reconfigured and a free storage device are six storage devices each having a capacity of 1 TB. When a RAID group of RAID 6 includes the six storage devices, the RAID group has a 4D+2P (4 data and 2 parities) configuration with 4 TB of effective capacity. Accordingly, the same storage capacity as that before the reconfiguration can be maintained.

As described above, when the same storage capacity as that before the reconfiguration can be maintained in the same RAID level, a RAID group may be reconfigured. When a RAID group is reconfigured with the reduced number of storage devices to be configured, the access performance might be lowered. Therefore, the reconfiguration of a RAID group should be confirmed by a user. A user may set the upper limit number of storage devices that can be reduced in advance so that a RAID group may be reconfigured when the number of storage devices to be reduced is equal to or smaller than the set upper limit number.

A technique for reconfiguring a RAID group has been disclosed in JP-A-07-141121. JP-A-07-141121 describes the case of increasing the number of storage devices configuring a RAID group. However, the technique can be similarly applied to the case of decreasing the number of storage devices configuring a RAID group by reversing the order of converting an address.

As described above, according to the embodiment of the invention, since complicate maintenance work such as replacement work part by part is not required when a failure has occurred in an array chassis, a user can perform operation and maintenance by replacement or removal of an array chassis without awareness of a complicate procedure.

According to the embodiment of the invention, since data stored in a storage device under normal operation can be automatically migrated to another array chassis when an array chassis is removed, a user can safely remove an array chassis after the completion of migration processing.

According to the embodiment of the invention, capacity can be added by the addition of an array chassis without stopping the operation of a system.

According to the embodiment of the invention, when storage devices different in capacity coexist in a RAID group due to failure occurrence in a storage device, an unusable storage area can be reduced to improve capacity efficiency by reconfiguring the RAID group.

In the configuration of the computer system shown in FIG. 1, array chassis are connected with one another by utilizing the backend switches. When a backend switch is included in a computer system, the addition and removal of an array chassis is easier, but the introduction cost for the backend switch is required. Further, the maintenance cost for the backend switch is also required.

Consequently, a configuration not utilizing a backend switch will be explained as a modified example of the embodiment of the invention.

Figure 10:
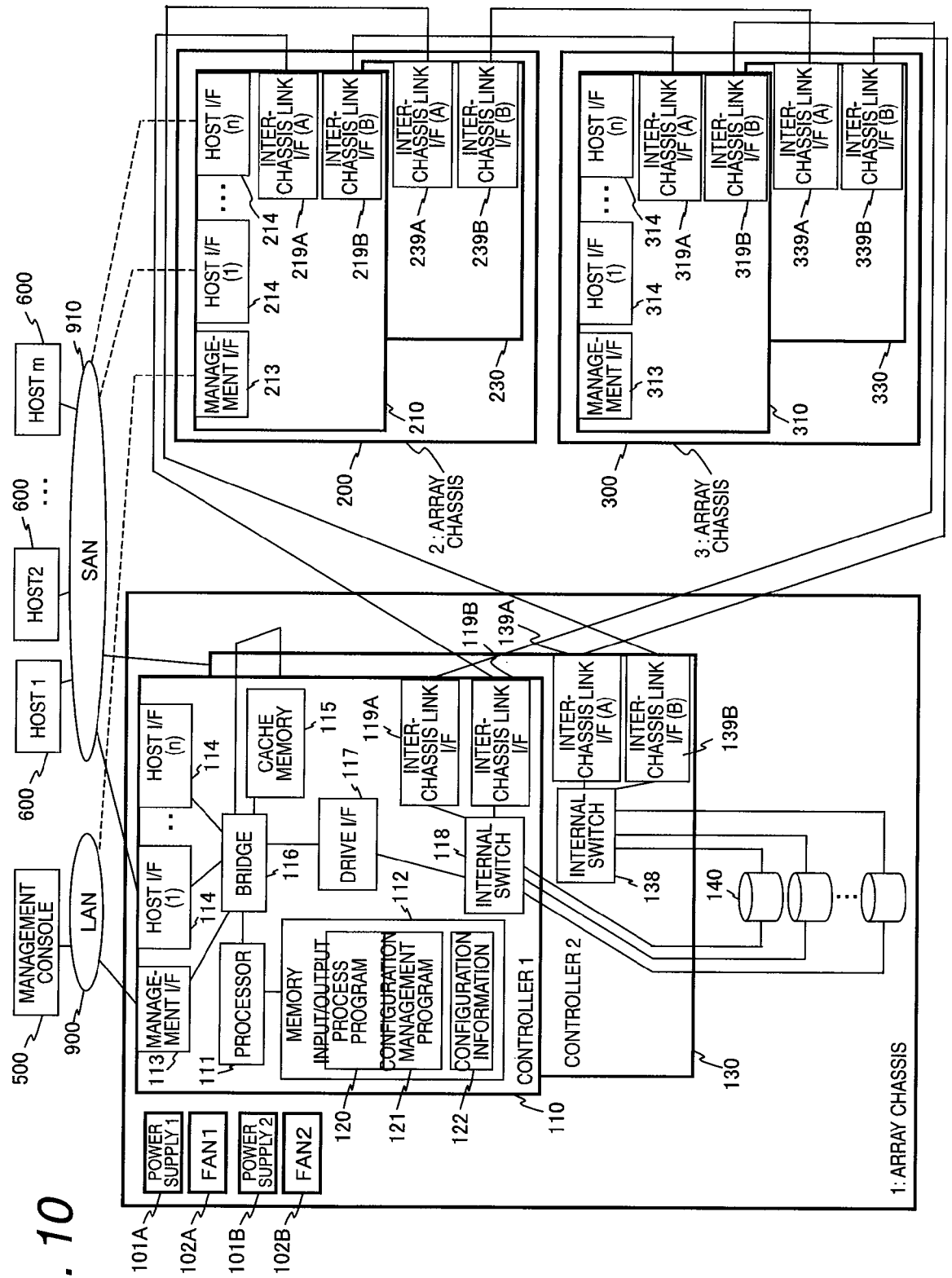
FIG. 10 is a diagram showing a configuration of a modified example of the computer system according to the embodiment of the invention.

FIG. 10 shows a configuration of a modified example of the computer system according to the embodiment of the invention.

The modified example of the computer system according to the embodiment of the invention includes array chassis 100, 200 and 300, a management console 500 and host computers 600, not including a backend switch as described above.

A configuration of each of the array chassis differs from that shown in FIG. 1 in that each controller has two inter-chassis link I/Fs. Other configurations are the same as those shown in FIG. 1.

The array chassis is cascade connected to another array chassis via the inter-chassis link I/Fs. Further, the array chassis are connected in a ring form in order to enable the addition and removal of any array chassis. The array chassis may be connected in a ring form all the time or only when the array chassis is removed or added.

As described above, although cascade connecting the array chassis with one another with a ring form configuration makes the connection among the array chassis complicated, the invention can be carried out without utilizing the backend switch.

However, when a SAS (Serial Attached SCSI) is utilized for the connection among the array chassis, there arises a problem that the array chassis cannot be connected in a ring form. Therefore, the array chassis are configured in a double ring form by the respective two inter-chassis link I/Fs, and one or more paths are invalidated, so that a redundant tree-like topology can be formed. In this case, a procedure for removing an array chassis will be explained with reference to FIG. 11.

FIG. 11 is a diagram explaining a procedure for removing an array chassis in the modified example of the embodiment of the invention.

In a configuration shown in the upper portion in FIG. 11, with an array chassis 1 (100) being as a base array chassis, an array chassis 2 (200) and an array chassis 3 (300) are connected to the array chassis 1 (100), and the connection between the array chassis 2 (200) and the array chassis 3 (300) is invalidated. The base array chassis is an array chassis having control and connected to a host computer.

Here, the case where the array chassis 1 (100) is removed from the configuration shown in the upper portion in FIG. 11, and the array chassis 2 (200) is changed to serve as the base array chassis will be explained as one example. Processing executed in this case corresponds to the processing in S707 in FIG. 7.

A controller 110 in the array chassis 1 (100) changes the array chassis 2 (200) to serve as the base array chassis by the processing up to S706 in FIG. 7. Then, the controller 110 invalidates the connection between the array chassis 1 (100) and the array chassis 3 (300), and validates the connection between the array chassis 2 (200) and the array chassis 3 (300). Finally, the controller 110 invalidates the connection between the array chassis 1 (100) and the array chassis 2 (200) and commands a user to remove the array chassis (100) in the processing in S708.

The processing such as the migration of data stored in the storage devices in the array chassis is the same as that in the embodiment of the invention shown in FIG. 3 or the like.

According to the modified example of the embodiment of the invention, the introduction cost for hardware can be reduced compared with the case of using the backend switch in addition to the advantage described above. Further, the cost necessary for maintenance of the backend switch can be reduced.

What is claimed is:

1. A computer system comprising:

a plurality of storage systems accessed by a host computer, the plurality of storage systems including a first storage system and a second storage system, the first storage system including at least one first interface coupled to the host computer and the second storage system, a first processor coupled to the first interface, a first memory coupled to the first processor and a plurality of first storage devices for storing data read and written by the host computer, the second storage system including at least one second interface coupled to the host computer and the first storage system, a second processor coupled to the second interface, a second memory coupled to the second processor and a plurality of second storage devices for storing data read and written by the host computer, wherein the first storage system determines whether or not the number of the first storage devices under normal operation in the first storage system is larger than a predetermined threshold, determines whether or not data stored in the first storage devices under normal operation can be migrated to the second storage devices if the number of the first storage devices under normal operation is equal to or smaller than the predetermined threshold, duplicates the data stored in the first storage devices under normal operation to the second storage devices if the data stored in the first storage devices under normal operation can be migrated to the second storage devices, and outputs information indicating that the first storage system can be removed from the computer system.

2. A computer system according to claim 1, wherein the first storage devices and the second storage devices make data accessed by the host computer redundant and store the data therein; and the first storage system recovers, if a failure has occurred in the first storage device, data stored in the first storage device in which a failure has occurred to the second storage device, and thereafter duplicates the data stored in the first storage devices under normal operation to the second storage devices if the number of the first storage devices under normal operation is equal to or smaller than the predetermined threshold.

3. A computer system according to claim 1, wherein the first storage system determines that the data stored in the first storage devices under normal operation can be migrated to the second storage devices if the second storage system includes the same number of the second storage devices that are unused and in which a failure has not occurred as the first storage devices under normal operation.

4. A computer system according to claim 1, wherein the first storage system determines that the data stored in the first storage devices under normal operation can be migrated to the second storage devices if the second storage system includes the same capacity of the second storage devices that are unused and in which a failure has not occurred as the first storage devices under normal operation.

5. A computer system according to claim 1, wherein the first storage system calculates a usable capacity in the plurality of storage systems as a whole if the data stored in the first storage devices under normal operation are migrated to the second storage devices and a usable capacity if the data are not migrated, and migrates the data stored in the first storage devices under normal operation to the second storage devices irrespective of the number of the first storage devices under normal operation if a usable capacity becomes larger by migrating the data stored in the first storage devices under normal operation to the second storage devices.

6. A computer system according to claim 1, further comprising a management console for managing the plurality of storage systems, wherein the management console accepts the addition of a storage area newly provided by an unused storage device included in the first storage devices and the second storage devices, and outputs, if a capacity of the unused storage device included in the first storage devices and the second storage devices becomes smaller than that of the first storage devices that are used in the first storage system after the addition of the newly provided storage area, and the number of the unused storage devices included in the first storage devices and the second storage devices becomes smaller than that of the first storage devices that are used in the first storage system, or if a capacity of the unused storage device included in the first storage devices and the second storage devices becomes smaller than that of the second storage devices that are used in the second storage system, and the number of the unused storage devices included in the first storage devices and the second storage devices becomes smaller than that of the second storage devices that are used in the second storage system, information indicating that effect.

7. A computer system according to claim 1, wherein the second storage system is accessed by the host computer via the first storage system; and the first storage system sets the coupling between the first storage system and the host computer invalid if all data stored in the first storage devices are migrated to the second storage devices, and commands the second storage system to set the coupling between the second storage system and the host computer valid.

8. A computer system according to claim 1, wherein the first storage system records a used time of the first storage system, determines whether or not data stored in the first storage devices under normal operation can be migrated to the second storage devices if the used time exceeds a predetermined threshold, and duplicates the data stored in the first storage devices under normal operation to the second storage devices if the data stored in the first storage devices under normal operation can be migrated to the second storage devices.

9. A computer system according to claim 1, further comprising a backend switch, wherein the plurality of storage systems are coupled to each other via the backend switch.

10. A computer system according to claim 1, wherein the plurality of storage systems further include a third storage system;

the second storage system and the third storage system are accessed by the host computer via the first storage system;

the third storage system includes a plurality of third interfaces coupled to the first storage system, a third processor coupled to the third interfaces, a third memory coupled to the third processor and a plurality of third storage devices for storing data read and written by the host computer;

the first storage system includes the plurality of first interfaces;

the second storage system includes the plurality of second interfaces;

the first interfaces are coupled to one of the second storage system and the third storage system; and the first storage system sets the coupling between the first storage system and the host computer invalid after all data stored in the first storage devices are migrated to the second storage devices, commands the storage system coupled to the first interfaces to set the coupling between the storage system and the first storage system invalid, and selects one storage system from the plurality of storage systems and commands the selected storage system to set the coupling between the selected storage system and the host computer valid.

11. A storage system accessed by a host computer comprising:

an interface coupled to the host computer and another storage system, a processor coupled to the interface, a memory coupled to the processor and a plurality of first storage devices for storing data read and written by the host computer, wherein the processor determines whether or not the number of the first storage devices under normal operation is larger than a predetermined threshold, determines whether or not data stored in the first storage devices under normal operation can be migrated to a plurality of second storage devices included in the another storage system if the number of the first storage devices under normal operation is equal to or smaller than the predetermined threshold, duplicates the data stored in the first storage devices under normal operation to the second storage devices if the data stored in the first storage devices under normal operation can be migrated to the second storage devices, and outputs information indicating that the coupling between the host computer and the storage system can be decoupled.

12. A storage system according to claim 11, wherein the first storage devices make data accessed by the host computer redundant and store the data therein; and the processor recovers, if a failure has occurred in the first storage device, data stored in the first storage device in which a failure has occurred to the second storage device, and thereafter duplicates the data stored in the first storage devices under normal operation to the second storage devices if the number of the first storage devices under normal operation is equal to or smaller than the predetermined threshold.

13. A storage system according to claim 11, wherein the processor determines that the data stored in the first storage devices under normal operation can be migrated to the second storage devices if the another storage system includes the same number of the second storage devices that are unused and in which a failure has not occurred as the first storage devices under normal operation.

14. A storage system according to claim 11, wherein the processor determines that the data stored in the first storage devices under normal operation can be migrated to the second storage devices if the another storage system includes the same capacity of the second storage devices that are unused and in which a failure has not occurred as the first storage devices under normal operation.

15. A computer system comprising:

a plurality of storage systems accessed by a host computer, the plurality of storage systems including a first storage system and a second storage system, the first storage system including at least one first interface coupled to the host computer and the second storage system, a first processor coupled to the first interface, a first memory coupled to the first processor and a plurality of first storage devices for storing data read and written by the host computer, the second storage system including at least one second interface coupled to the host computer and the first storage system, a second processor coupled to the second interface, a second memory coupled to the second processor and a plurality of second storage devices for storing data read and written by the host computer, wherein the first storage devices and the second storage devices make data accessed by the host computer redundant and store the data therein; and the first storage system determines whether or not the first storage device that is unused and in which a failure has not occurred is present if a failure has occurred in the first storage device, recovers the data stored in the first storage device in which a failure has occurred to the first storage device that is unused and in which a failure has not occurred if the first storage device that is unused and in which a failure has not occurred is present, determines whether or not the number of the first storage devices under normal operation in the first storage system is larger than a predetermined threshold if the first storage device that is unused and in which a failure has not occurred is not present, determines whether or not the data stored in the first storage device in which a failure has occurred and data stored in the first storage devices under normal operation can be migrated to the second storage devices if the number of the first storage devices under normal operation is equal to or smaller than the predetermined threshold, recovers the data stored in the first storage device in which a failure has occurred to the second storage device if the data stored in the first storage device in which a failure has occurred and the data stored in the first storage devices under normal operation can be migrated to the second storage devices, duplicates the data stored in the first storage devices under normal operation to the second storage devices, outputs information indicating that the first storage system can be removed from the computer system, determines whether or not the second storage system includes the same capacity of the second storage devices that are unused and in which a failure has not occurred as the total capacity of the first storage device in which a failure has occurred and the first storage devices under normal operation if the data stored in the first storage device in which a failure has occurred and the data stored in the first storage devices under normal operation cannot be migrated to the second storage devices, outputs information requesting the addition of another storage system to the computer system if the storage system does not include the same capacity of the second storage devices that are unused and in which a failure has not occurred as the total capacity of the first storage device in which a failure has occurred and the first storage devices under normal operation, migrates the data stored in the first storage device in which a failure has occurred and the data stored in the first storage devices under normal operation to the second storage devices if the second storage system includes the same capacity of the second storage devices that are unused and in which a failure has not occurred as the total capacity of the first storage device in which a failure has occurred and the first storage devices under normal operation, outputs information indicating that the first storage system can be removed from the computer system, determines whether or not the data stored in the first storage device in which a failure has occurred and the data stored in the first storage devices under normal operation can be migrated to the second storage devices if the number of the first storage devices under normal operation is larger than the predetermined threshold, calculates a usable capacity in the plurality of storage systems as a whole if the data stored in the first storage devices under normal operation are migrated to the second storage devices and a usable capacity if the data are not migrated in the case where the data stored in the first storage device in which a failure has occurred and the data stored in the first storage devices under normal operation can be migrated to the second storage devices, recovers the data stored in the first storage device in which a failure has occurred to the second storage device if a usable capacity becomes larger by migrating the data stored in the first storage devices under normal operation to the second storage devices, duplicates the data stored in the first storage devices under normal operation to the second storage devices, outputs information indicating that the first storage system can be removed from the computer system, determines whether or not the second storage device to which the data stored in the first storage device in which a failure has occurred can be migrated is present if a usable capacity does not become larger even by migrating the data stored in the first storage devices under normal operation to the second storage devices, outputs information requesting the addition of another storage system to the computer system if the second storage device to which the data stored in the first storage device in which a failure has occurred can be migrated is not present, and recovers the data stored in the first storage device in which a failure has occurred to the second storage device if the second storage device to which the data stored in the first storage device in which a failure has occurred can be migrated is present.

\* \* \* \* \*